(12) United States Patent
Duffie, III

(10) Patent No.: US 10,958,526 B2
(45) Date of Patent: Mar. 23, 2021

(54) METHODS FOR MANAGING BANDWIDTH ALLOCATION IN A CLOUD-BASED SYSTEM AND RELATED BANDWIDTH MANAGERS AND COMPUTER PROGRAM PRODUCTS

(71) Applicant: Sensus Spectrum, LLC, Morrisville, NC (US)

(72) Inventor: John Brawner Duffie, III, Cary, NC (US)

(73) Assignee: Sensus Spectrum, LLC, Morrisville, NC (US)

( * ) Notice: Subject to any disclaimer, the term of this patent is extended or adjusted under 35 U.S.C. 154(b) by 0 days.

(21) Appl. No.: 16/595,909

(22) Filed: Oct. 8, 2019

(65) Prior Publication Data
US 2020/0119994 A1 Apr. 16, 2020

Related U.S. Application Data

(60) Provisional application No. 62/744,373, filed on Oct. 11, 2018.

(51) Int. Cl.
*H04L 12/24* (2006.01)
*H04L 29/08* (2006.01)

(52) U.S. Cl.
CPC .......... *H04L 41/0896* (2013.01); *H04L 67/10* (2013.01); *H04L 67/26* (2013.01)

(58) Field of Classification Search
CPC ..... G06F 2213/0062; H04L 2012/5632; H04L 41/0896; H04L 47/52
See application file for complete search history.

(56) References Cited

U.S. PATENT DOCUMENTS 7,751,315 B1 * 7/2010 Pai .................. H04L 12/2801
                                          370/230
8,358,579 B1 * 1/2013 Walsh .................. G06Q 10/00
                                          370/230

(Continued)

OTHER PUBLICATIONS

Divakaran et al., "An Online Integrated Resource Allocator for Guaranteed Performance in Data Centers," IEEE Transactions on Parallel and Distributed Systems, vol. 25, No. 6, Jun. 1, 2014.

(Continued)

*Primary Examiner* — Mohamed A. Wasel
(74) *Attorney, Agent, or Firm* — Stanek Lemon Crouse & Meeks, PA

(57) ABSTRACT

Methods for allocating bandwidth in a central cloud-based system are provided including receiving a request for a subscription for information stored in the central cloud-based system from a third-party customer and allocating one or more partitions in a queue to the third-party customer. The one or more partitions each have corresponding threads and a number of the one or more partitions is determined by an estimated amount of traffic associated with the requested subscription for the third-party customer. Information is provided meeting terms of the subscription to the third-party customer using the allocated one or more partitions in the queue and the corresponding threads. At least one of the receiving, allocating and providing is implemented by at least one processor. Related devices and computer program products are also provided.

20 Claims, 6 Drawing Sheets

(56) References Cited

U.S. PATENT DOCUMENTS

| | | |
|---|---|---|
| 2004/0230444 A1 | 11/2004 | Holt |
| 2005/0246186 A1 | 11/2005 | Nikolov |
| 2007/0077069 A1* | 4/2007 | Farmer ............... H04J 14/0282 398/72 |
| 2011/0276972 A1* | 11/2011 | Chung .................. G06F 9/5016 718/103 |
| 2011/0276973 A1* | 11/2011 | Chung ................ G06F 13/1663 718/103 |
| 2013/0060834 A1 | 3/2013 | Paramasivam et al. |
| 2013/0084878 A1* | 4/2013 | Chen .................... H04W 72/10 455/452.1 |
| 2016/0262160 A1 | 9/2016 | Mo |
| 2017/0214737 A1 | 7/2017 | Agarwal et al. |
| 2018/0275923 A1 | 9/2018 | Earhart et al. |
| 2019/0208445 A1* | 7/2019 | Klatsky .................. H04L 43/16 |

OTHER PUBLICATIONS

International Search Report and Written Opinion, PCT/IB2019/058567, dated Nov. 25, 2019, 10 pages.

* cited by examiner

METHODS FOR MANAGING BANDWIDTH ALLOCATION IN A CLOUD-BASED SYSTEM AND RELATED BANDWIDTH MANAGERS AND COMPUTER PROGRAM PRODUCTS

CLAIM OF PRIORITY

The present application claims priority to U.S. Provisional Application Ser. No. 62/744,373, filed on Oct. 11, 2018, entitled METHODS, SYSTEMS AND COMPUTER PROGRAM PRODUCTS FOR MANAGING BANDWIDTH ALLOCATION IN A CLOUD-BASED SYSTEM, the content of which is hereby incorporated herein by reference as if set forth in its entirety.

FIELD

The present inventive concept relates generally to cloud-based computer systems, and, more particularly, to managing bandwidth allocation in and out of the cloud.

BACKGROUND

Providers of computer services are generally critiqued by customers based on the quality of service provided. Specifically, providers of communication services, such as cell phone and internet providers, are evaluated based on the user's experience with the service. For example, when a communication takes too long, is interrupted or fails, the consumer does not have a good experience with the service and, thus, the provider is given a poor quality of service ranking. Providers of services are constantly looking for ways to improve the quality of service as viewed by the consumer, especially in "real time" applications.

SUMMARY

Some embodiments of the present inventive concept provide methods for allocating bandwidth in a central cloud-based system including receiving a request for a subscription for information stored in the central cloud-based system from a third-party customer and allocating one or more partitions in a queue to the third-party customer. The one or more partitions each have corresponding threads and a number of the one or more partitions is determined by an estimated amount of traffic associated with the requested subscription for the third-party customer. Information is provided meeting terms of the subscription to the third-party customer using the allocated one or more partitions in the queue and the corresponding threads. At least one of the receiving, allocating and providing is implemented by at least one processor.

In further embodiments, allocating may be preceded by determining, responsive to the request for the subscription, if the one or more partitions are already reserved for the third-party customer; and allocating the one or more partitions only if it is determined that the one or more partitions have not been already reserved.

In still further embodiments, the method may further include receiving a request for additional bandwidth from the third-party customer; and allocating additional unused partitions in the queue responsive to the request for additional bandwidth.

In some embodiments, the method may further include monitoring the central cloud-based system for an available number of partitions; determining if the available number of partitions is below a predefined threshold; and creating new queues having partitions if it is determined that the available number of partitions is below the predefined threshold.

In further embodiments, each of the one or more partitions in the queue may have a single corresponding source coupled to the one or more partitions by the corresponding thread.

In still further embodiments, each of the one or more partitions may have a guaranteed throughput independent of any remaining partitions.

In some embodiments, allocating the one or more partitions may include allocating unassigned partitions already existing in the queue.

In further embodiments, the request for the subscription may include a type of traffic the third-party customer is interested in and a destination for the information. The method may further include recognizing an inbound message that matches the type of traffic the third-party customer is interested in; and forwarding the inbound message to the third-party customer using the destination.

In still further embodiments, the information stored in the central cloud-based system may be pushed into the central cloud-based system by one or more third parties and the information may include both raw data and transformed data.

In some embodiments, the central cloud-based system may be XCloud.

In further embodiments, the request for the subscription may be a representational state transfer (REST) request.

Related bandwidth managers and computer program products are also provided.

DETAILED DESCRIPTION

Figure 1:
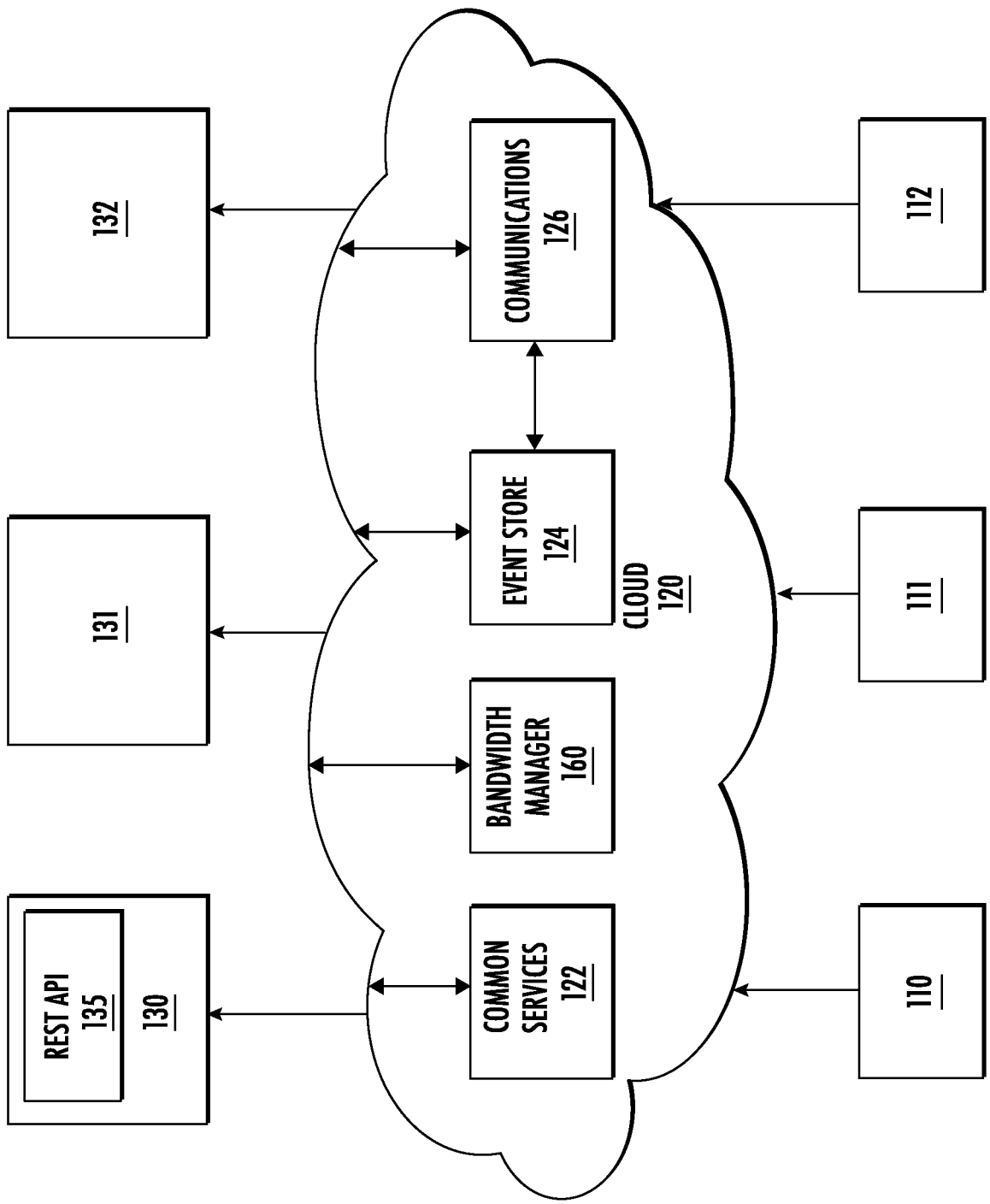
FIG. 1 is a block diagram of a simple cloud-based system that may be used in accordance with some embodiments of the present inventive concept.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, a particular level service is generally expected from service providers. If the level of service expected is not met, customers may look for other providers of the service. Real time communication services are especially vulnerable to customer service complaints. As used herein, "real time" refers to processing data in such a small amount of time, for example, milliseconds, such that data appears to be available virtually immediately. Real time communications are very important for conventional businesses and generally depend on having enough bandwidth available to the customer to communicate data as needed. Accordingly, some embodiments of the present inventive concept provide methods, devices and computer program products for bandwidth management that allow the customer to receive an acceptable quality of service in real time as will be discussed further below with respect to FIGS. 1 through 6.

Embodiments of the present inventive concept will be discussed with respect to a central cloud service. However, it will be understood that embodiments of the present inventive concept are not limited to this configuration. In particular, a bandwidth manager in accordance with embodiments discussed herein may be used in any system having bandwidth requirements without departing from the scope of the inventive concept.

A central cloud service provided by Xylem, will be discussed in combination with the bandwidth manager in accordance with embodiments of the present inventive concept. In conventional systems, protocols are only generally exchangeable between compatible systems, in other words, the ability for any component of the system to communicate directly with any other component of the system is lacking in most conventional systems. The central cloud service provided by Xylem (XCloud) provides common data infrastructure and application programming interfaces (APIs) to support advanced data analytic applications from different sources. An API is a software intermediary that allows two applications to talk to each other. For example, each time you use an application such as Facebook, send an instant message, or check the weather on your phone, you are using an API. Using the common data infrastructure and these APIs, the central cloud service provided by Xylem provides a single "data lake" available to all applications, regardless of source. As used herein, a "data lake" refers to a repository of stored data. In particular, a data lake is generally a single store of all enterprise data including raw copies of source system data and transformed data. Transformed data may include any data that has been manipulated in any way or calculated/determined using raw data. Thus, unlike conventional systems, the central cloud service provided by Xylem may allow communication among systems historically considered incompatible.

Although embodiments of the present inventive concept discuss using a cloud-based system provided by Xylem, embodiments of the present inventive concept are not limited to this configuration. Methods and systems discussed herein can be used in any cloud service without departing from the scope of the present inventive concept.

In embodiments using the XCLoud, the XCloud platform may provide data normalization and storage; receive data input from multiple sources; and present data using multiple transport mechanisms (i.e., cellular, satellite, FlexNet). FLEXNET is a radio network from the Xylem. FLEXNET radio networks operate in licensed spectrum in the 900 MHz range, with the uplink utilizing 901 to 902 MHz and the downlink utilizing 940 to 941 MHz. These spectrum allocations are subdivided into multiple narrowband channels, for example, 25 KHz channels. Individual narrowband channels can be allocated to respective control modules, or a set of control modules can be assigned to operate on one or more such channels, while other groups are assigned to other channels. Data is sent on a per-channel basis using Frequency Shift Keying ("FSK"), for example, 4, 8, or 16 FSK, where the data may be "packaged" in messages of a predefined bit length. Although some embodiments may use the FLEXNET as the radio communication network, embodiments of the present inventive concept are not limited thereto. Any radio network may be used without departing from the scope of the present inventive concept.

The data repository (lake) can include data in both its raw form and its parsed (processed) form (transformed data) and may be available to any application that has a need for the data. The XCloud platform may also provide for common application tools such as user access controls, the look and feel of the user interface (UI), data visualizations (i.e., time series, etc.); user notifications (i.e., emails, texts, voice calls, etc.) and the like.

Referring now to FIG. 1, a simple block diagram of a system 105 that may be used in accordance with some embodiments of the present inventive concept will be discussed. As illustrated in FIG. 1, the system 105 includes a central cloud service 120 that communicates with a plurality of third parties 110 and customers 130. It will be understood that the system 105 of FIG. 1 is provided for example only and that embodiments of the present inventive concept are not limited thereto. For example, there may more or less customers or third parties and more modules may be present without departing from the scope of the present inventive concept.

Referring again to FIG. 1, in some embodiments, the central cloud service 120 is provided by XCloud, however, embodiments of the present inventive concept are not limited thereto. As further illustrated in FIG. 1, numerous third parties 110, 111 and 112 push traffic into a central cloud service 120 (XCloud). Other third parties (consumers) 130, 131 and 132 are configured to perform machine-to-machine requests to "tap into" the traffic pushed into the cloud service 120. For example, the third parties 130, 131 and 132 may "tap into" the pushed traffic using a Representational State Transfer (REST) API 135 notifying cloud service 120 (XCloud) of the type of traffic that the particular customer 130 is interested in and a destination REST API. The definition of the type of traffic creates an arbitrary filter of information in the cloud for the customer 131. When the cloud service 120 recognizes an inbound message that matches the filter associated with the REST API 135, the message is forwarded to the subscriber (customer 130) by invoking the REST API provided by the subscriber.

REST is an architectural style that defines a set of constraints to be used for creating web services. Web services that conform to the REST architectural style, or RESTful web services, provide interoperability between computer systems on the Internet. It will be understood that although the REST API 135 is only shown associated with a particular customer in FIG. 1, embodiments of the present inventive concept are not limited to this configuration. Each third-party can have a customized API without departing from the scope of the present inventive concept. Furthermore, although the REST API 135 is show as part of the customer network 130, the REST API 135 can be separate and independent from the customer network.

The cloud service 120, for example, XCloud, is a centralized solution that adapts to all types of producers 110, 111 and 112 (a third-party that pushes traffic into the cloud) and consumers 130, 131 and 132 (a third-party that subscribes to traffic from the cloud). In some embodiments, a subscription is a REST request where a consumer specifies a pattern filter and callback REST API 135 as discussed above.

As further illustrated in FIG. 1, the central cloud 120 may further include additional modules therein. For example, the cloud 120 may include common services 122 such as access control, logging, time series and licensing; an event store 124 including data with logical partitions where data from sensors and collectors may be published; communications 126 including satellite, cellular, FLEXNET, Application poll and the like; and a bandwidth manager 160 in accordance with embodiments of the present inventive concept.

Conventional systems generally cannot provide the necessary quality of service required by customers due to the basic requirement for traffic between producers and consumers to be asynchronous. The model for asynchronous is to move traffic between producers (110, 111 and 112) and consumers (130, 131 and 132) using queues. Each consumer is given its own queue and dedicated resources are allocated to each queue for draining traffic. Customers are constantly being added and deleted from the cloud system. In other words, subscriptions to the data lake are being added and removed constantly. Thus, there is a need to dynamically add/remove subscriptions quickly. However, in conventional systems, queue creation and deletion takes too long to lend themselves to a real time system providing a necessary quality of service dictated by a service level agreement (SLA). The SLA typically specifies throughput and stability for a given consumer among other things. Further problems are presented by the time required to standup or remove a resource to drain the queue and pre-allocation of the queues/resources is generally complex and may create failure modes that are difficult to monitor and overcome.

Accordingly, some embodiments of the present inventive concept provide the ability to dynamically add and/or remove "subscriptions" in real time, thus, addressing problems in conventional solutions discussed above. In particular, some embodiments of the present inventive concept provide a bandwidth manager. As discussed above, the bandwidth manager may be used in combination with XCloud discussed above but is not limited to this configuration. Embodiments discussed herein produce a set of common, identical proxies that perform a message drain operation. In particular, at startup all proxies are commanded to drain from the same topic/queue. Some embodiments of the present inventive concept use Kafka, which is an asynchronous messaging system that allows producers to enqueue messages and consumers to drain them.

Those of skill in the art will understand Kafka and the functionality thereof, therefore, only a brief discussion of Kafka will be provided herein. With Kafka, messages are pushed to topics, for example, queues. Topics can include one or more partitions. A message is written to a single "partition" (file on a disk) on the topic. A single partition can only have a single consuming thread as will be discussed further with respect to FIG. 2. Since a single partition can only have single thread, performance is a scaled by the number of partitions and consumer count. This is customizable by an administrator without restarting the producers, consumers, or broker. A partition can be programmatically created relatively quickly (or taken down very quickly). Thus, at startup, a consumer specifies its topic. Internally, Kafka maps consumer threads to partitions. Kafka also uses (configurable) dynamic rebalancing algorithms to determine how to re-allocate partitions to consumers. In some embodiments, a private/value added producer code pushes a message, message key, and topic to the Kafka Producer API. Kafka internally tracks the number of partitions and hashes the key to determine which to use. In alternative embodiments, the private/value added producer code can take on the responsibility of mapping messages to partitions. Kafka Producer has another API that allows the producer to also specify partition along with the key, value, and topic. Thus, the bandwidth manager in accordance with embodiments of the present inventive concept may learn the number of partitions available from the Kafka service.

Figure 2:
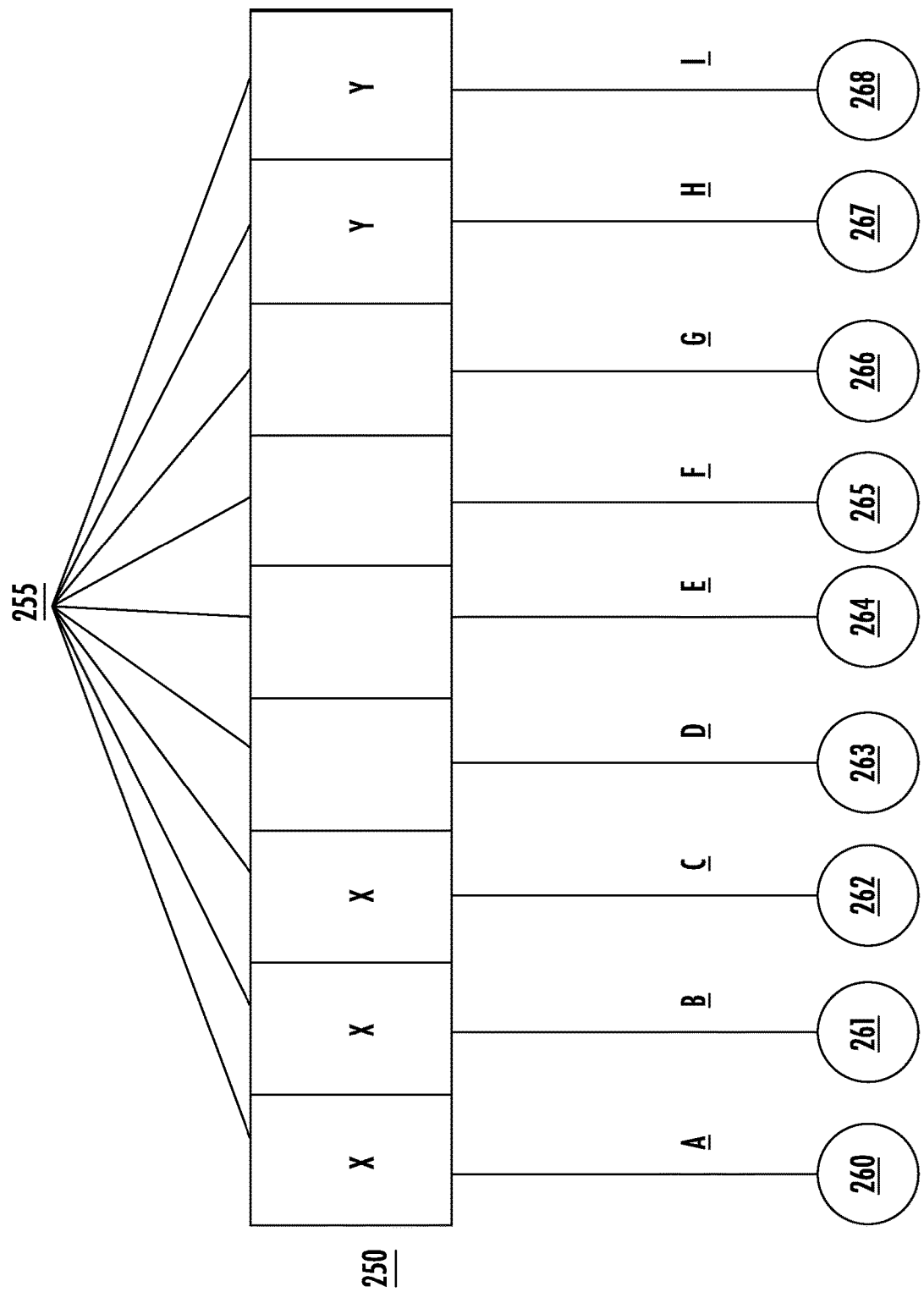
FIG. 2 is a block diagram of a queue including partitions in accordance with some embodiments of the present inventive concept.
Figure 3:
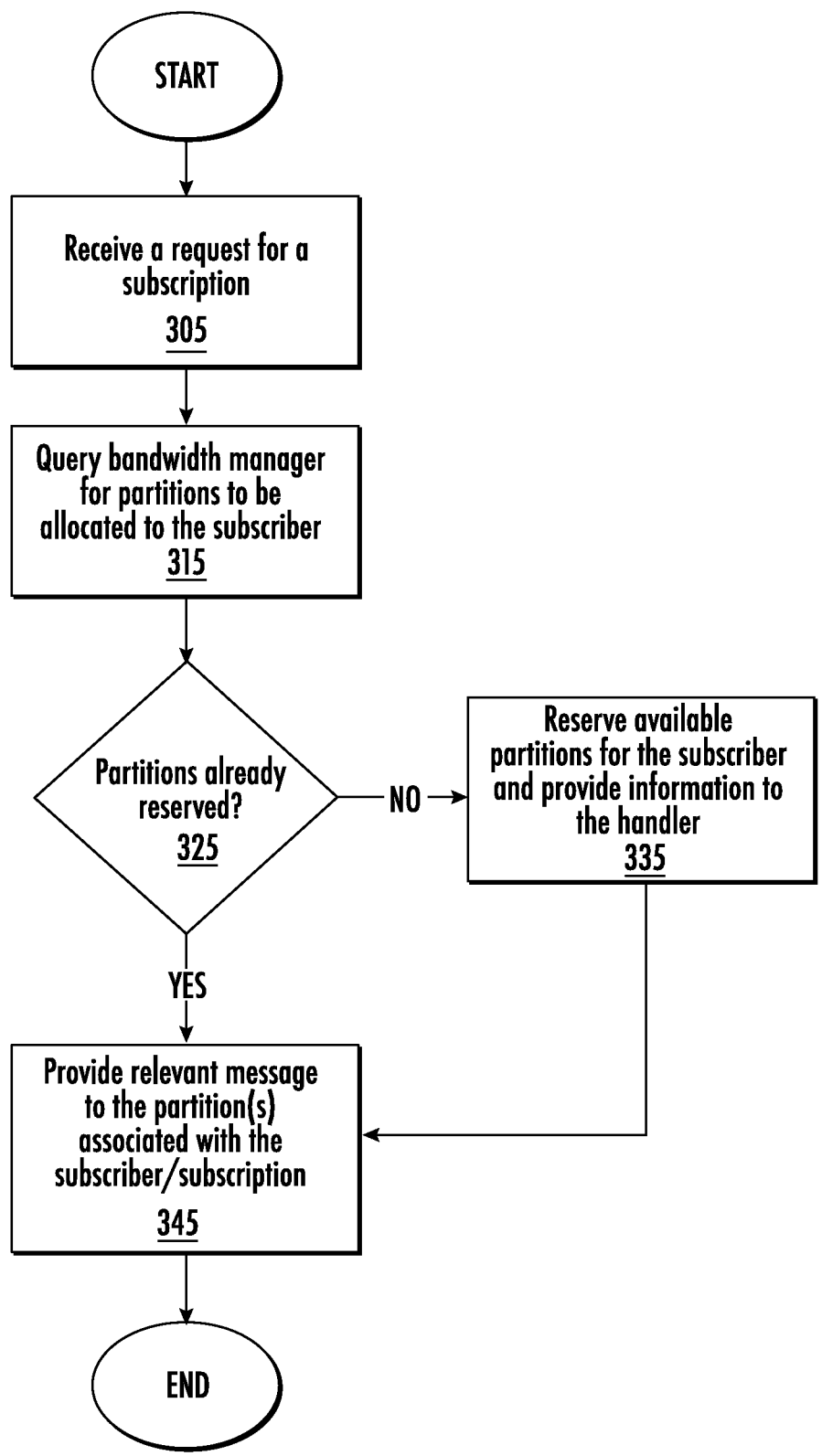
FIG. 3 is a flowchart illustrating operations in accordance with some embodiments of the present inventive concept.

Referring now to FIGS. 2 and 3, operations for allocating bandwidth in accordance with embodiments of the present inventive concept will be discussed. Operations begin with receiving a request for subscription (block 305). The subscription handler queries the bandwidth manager for partitions to be allocated to a subscriber (block 315). As illustrated in FIG. 2, the queue 250 includes a series of partitions 255, some of the partitions 255 are assigned, for example, X and Y, and some of the partitions 255 are empty and available. It is determined if the partitions 255 are already reserved (block 325). If the partitions 255 are not already reserved to the requesting subscriber, the bandwidth manager reserves one or more of the available partitions 255 from a free list and provides the information related to the reserved partition(s) back to the handler (block 335). Then, when corresponding messages are seen that match the subscriber's filter (subscription), the queuing logic will post the relevant message to the partition(s) associated with that subscriber/subscription (block 345). As further illustrated, each partition 255 has a single source (260 through 268) that accesses the corresponding partition 255 over a single thread (A through I). Thus, the same thread (A through I) will handle all messages for that consumer without fighting for bandwidth with another source. Each partition has a guaranteed throughput without interfering with any of the other partitions. In some embodiments, queues may include a status portion that may be used to communicate information with the customer, for example, the status portion may indicate how far behind the queue is operating.

Figure 4:
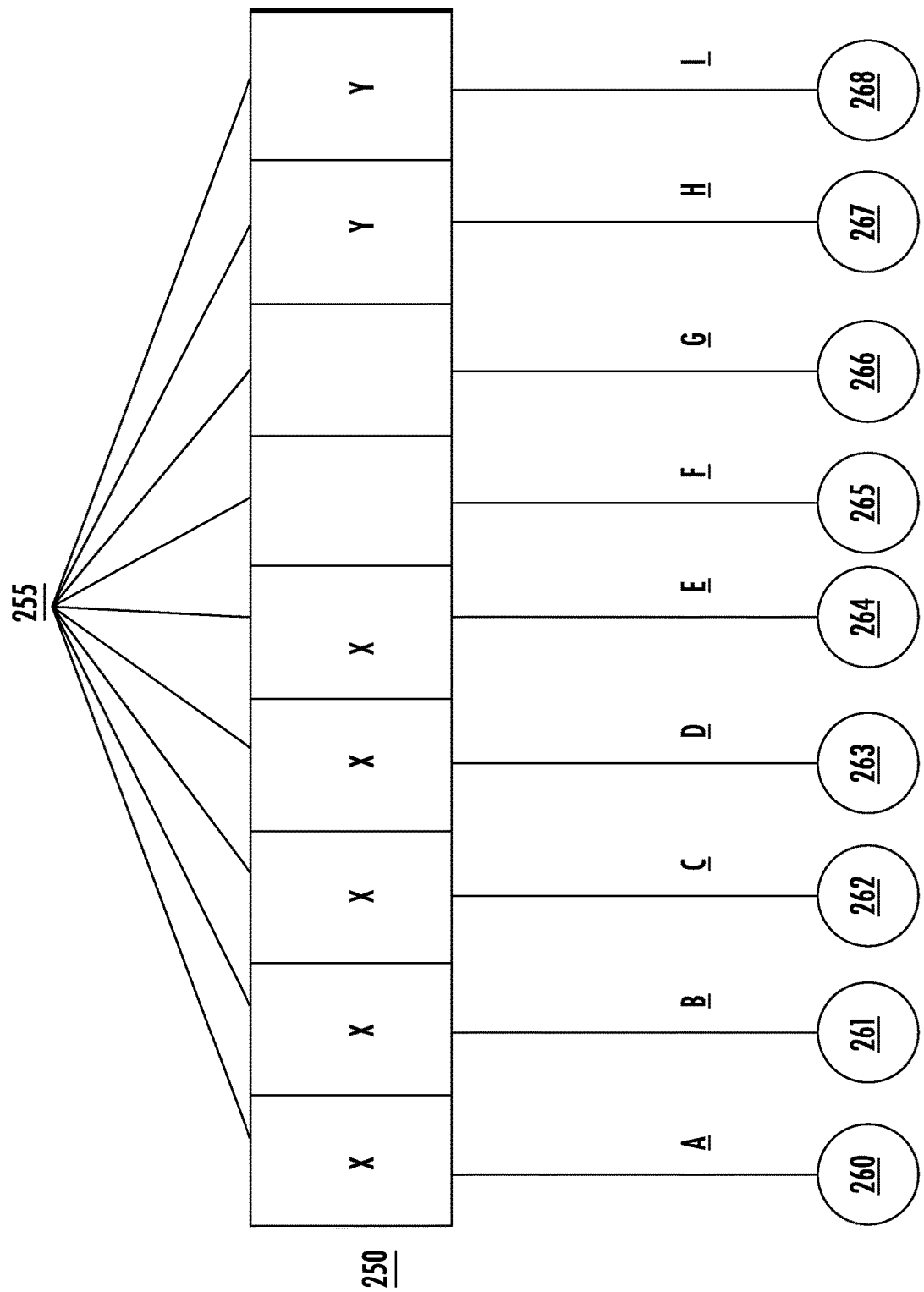
FIG. 4 is a block diagram of queue including partitions and additional allocations in accordance with some embodiments of the present inventive concept

Furthermore, some embodiments of the present inventive concept are configured to adjust to performance requirements of the consumer. In particular, a REST API as discussed above may be used to increase the number of partitions reserved for a consumer in real time. In other words, upon request, the customer may be rapidly allocated one or more of the unused partitions without effecting quality of service to this customer or any of the other customers. This request will result in an increased number of threads (A through I) reserved to that consumer without any changes to the dequeueing processes or starting up any new services as illustrated in FIG. 4. In particular, as illustrated in FIG. 4, customer X is allocated threads D and E in addition to A-C. Similarly, if a customer no longer requires the amount of bandwidth allocated to that particular customer, the threads may be released for use by other customers.

Some embodiments of the present inventive concept include the bandwidth manager includes a monitoring function. In these embodiments, the system is constantly monitored to determine if a number of available partitions have decreased below a threshold level. When it is determined that the available number of partitions has decreased below an acceptable threshold, new resources are created in anticipation of new subscribers, thus, possibly avoiding a long delay in creating the resources from scratch upon demand.

As discussed above, utilizing partitioned queues as part of a bandwidth manager allows customers who are unknown until runtime to be allocated resources in real time without reduction of quality of service to other customers. Customers can be added and deleted from the system quickly. Consumers can independently define and subscribe/unsubscribe for flows as needed. Thus, systems in accordance with embodiments of the present inventive concept can handle a high volume and rate of ingress traffic across various producers.

As further discussed above, consumers are isolated using the partitions allowing traffic to be routed to all consumers maintaining the SLA for each consumer, i.e. the behavior of one consumer does not adversely impact behavior of other consumers. In particular, if the throughput of one consumer ramps up, it does not interfere with the throughput of other consumers. Furthermore, if a consumer misbehaves in other ways such as instability, slow response, no response, and the like, it may not adversely impact the other consumers. Thus, the bandwidth manager in accordance with embodiments discussed herein may allow for isolation of information between partitions/subscribers, rapid and autonomous scale up/scale down of the allocated partitions, and the reduction of complex failure modes.

Figure 5:
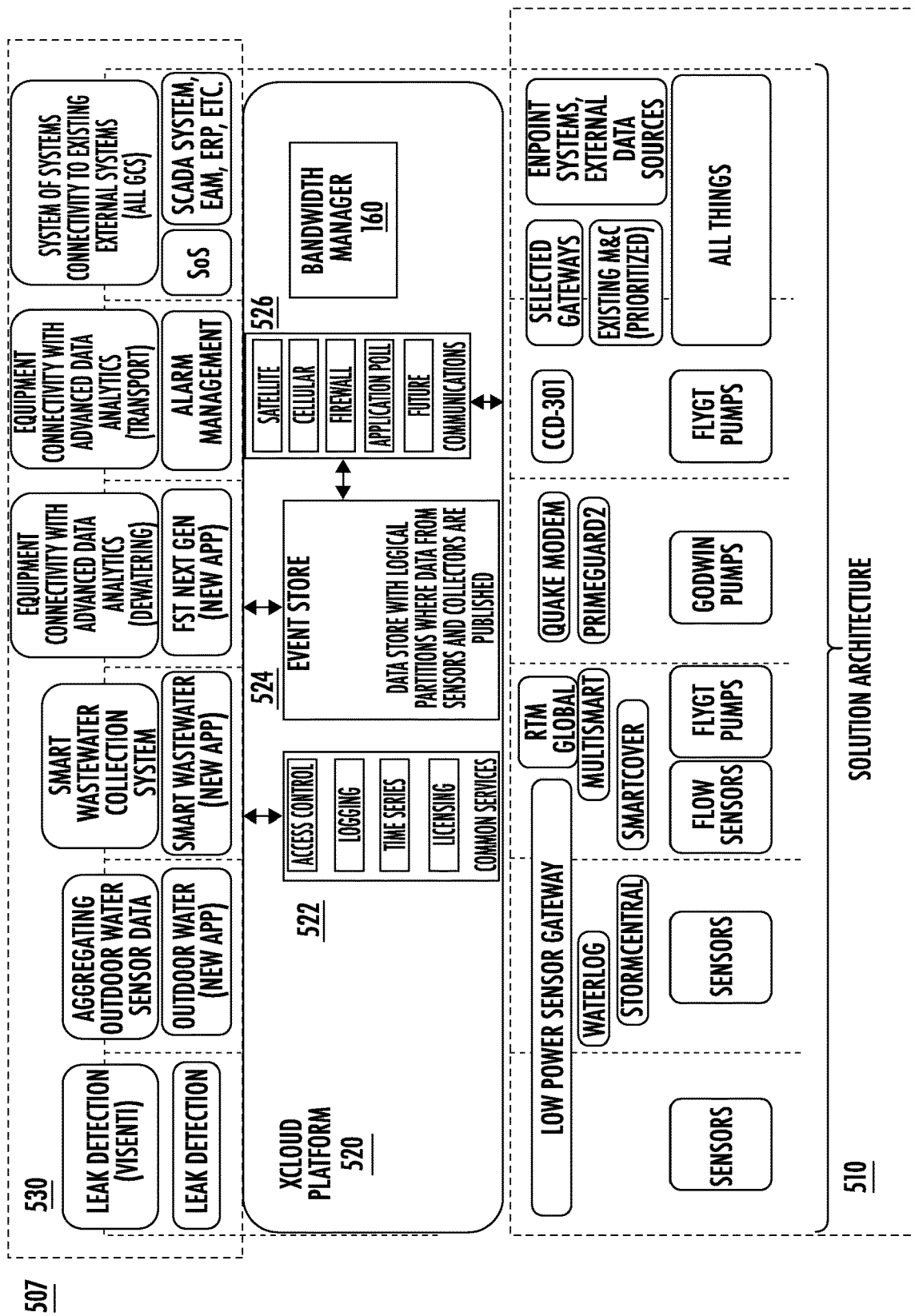
FIG. 5 is a more detailed block diagram of a cloud-based system that may be used in accordance with some embodiments of the present inventive concept.
Figure 6:
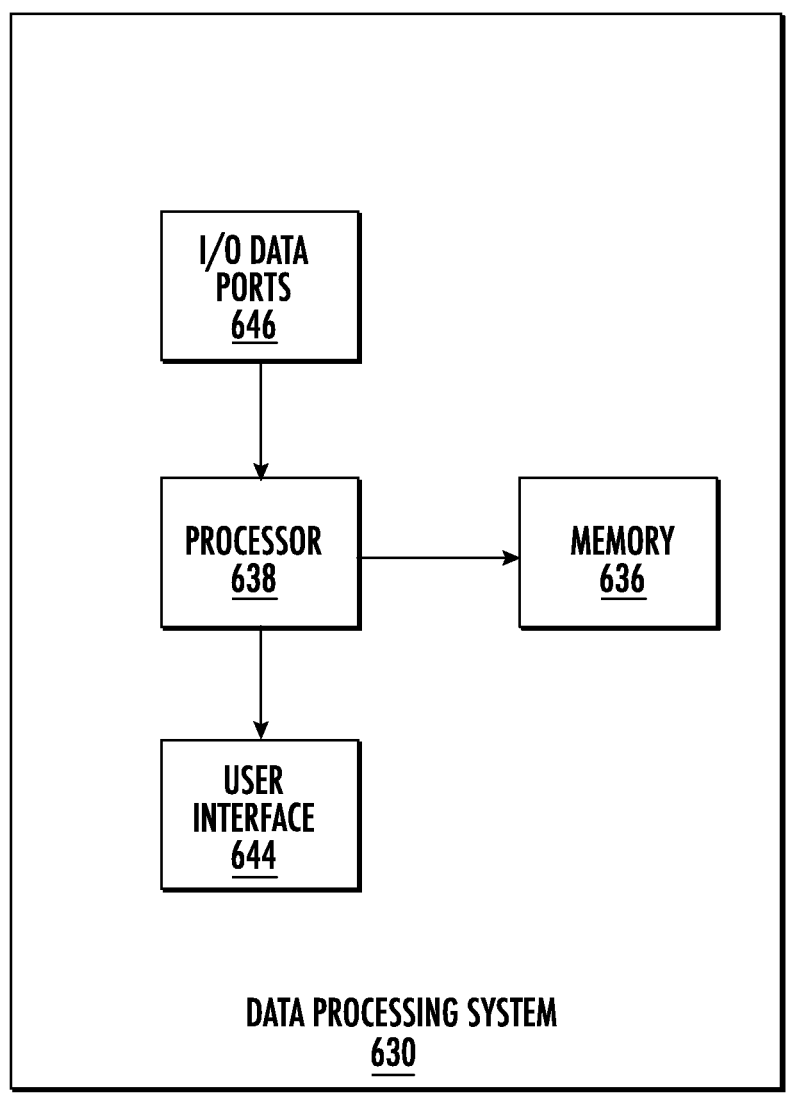
FIG. 6 is a block diagram of a data processing system that can be used in accordance with some embodiments of the present inventive concept.

Referring now to FIG. 5, a system 507 including a bandwidth manager in accordance with some embodiments of the present inventive concept is illustrated included real life examples. As illustrated in FIG. 5, the system 507 includes a central XCloud 520, a plurality of third parties 510 that push information into the XCloud 520 and a plurality of customers 530 that consume data from the XCloud. As discussed above, the bandwidth manager 160 is configured to allocate a specific partition of a queue to each customer upon request. The vertical lines in FIG. 5 illustrate example partitions for each particular customer 530. Thus, each customer 530 has a dedicated amount of bandwidth that cannot be accessed by another user. Each queue is associated with a single source. If the customer 530 needs more bandwidth, the request for more bandwidth can be allocated very quickly by assigning the customer another unallocated partition. If the system determines that the amount of unused bandwidth in the unallocated partitions is below a particular threshold, the system may automatically create more partitioned queues that will be available upon request, therefore, possibly avoiding a performance issue in the future.

As is clear from above, some aspects of the bandwidth manager 160 in accordance with the present inventive concept may be implemented using a data processing system. The data processing systems may be included in any of the devices discussed herein without departing from the scope of the present inventive concept. Example embodiments of a data processing system 630 configured in accordance with embodiments of the present inventive concept will be discussed with respect to FIG. 6. The data processing system 630 may include a user interface 644, including, for example, input device(s) such as a keyboard or keypad, a display, a speaker and/or microphone, and a memory 636 that communicate with a processor 638. The data processing system 630 may further include I/O data port(s) 646 that also communicates with the processor 638. The I/O data ports 646 can be used to transfer information between the data processing system 630 and another computer system or a network. These components may be conventional components such as those used in many conventional data processing systems, which may be configured to operate as described herein.

As will be appreciated by one of skill in the art, the inventive concept may be embodied as a method, data processing system, or computer program product. Accordingly, the present inventive concept may take the form of an entirely hardware embodiment or an embodiment combining software and hardware aspects all generally referred to herein as a "circuit" or "module." Furthermore, the present inventive concept may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present inventive concept may be written in an object oriented programming language such as Java®, Smalltalk or C++. However, the computer program code for carrying out operations of the present inventive concept may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The inventive concept is described in part below with reference to a flowchart illustration and/or block diagrams of methods, systems and computer program products according to embodiments of the inventive concept. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for allocating bandwidth in a central cloud-based system, the method comprising:
   receiving a request for a subscription for information stored in the central cloud-based system from a third-party customer;
   allocating one or more pre-existing partitions in a queue to the third-party customer responsive to the request for the subscription, the one or more pre-existing partitions each having dedicated corresponding threads, a number of the one or more pre-existing partitions being determined by an estimated amount of traffic associated with the requested subscription for the third-party customer; and
   providing information meeting terms of the subscription to the third-party customer using the allocated one or more pre-existing partitions in the queue and the corresponding dedicated threads,
   wherein at least one of the receiving, allocating and providing is implemented by at least one processor.

2. The method of claim 1, wherein allocating is preceded by:
   determining, responsive to the request for the subscription, if the one or more pre-existing partitions are already reserved for the third-party customer; and
   allocating the one or more pre-existing partitions only if it is determined that the one or more pre-existing partitions have not been already reserved.

3. The method of claim 1, further comprising:
   receiving a request for additional bandwidth from the third-party customer; and
   allocating additional unused pre-existing partitions in the queue responsive to the request for additional bandwidth.

4. The method of claim 1, further comprising:
   monitoring the central cloud-based system for an available number of pre-existing partitions;
   determining if the available number of pre-existing partitions is below a predefined threshold; and
   creating new queues having partitions if it is determined that the available number of partitions is below the predefined threshold.

5. The method of claim 1, wherein each of the one or more pre-existing partitions in the queue has a single corresponding source coupled to the one or more pre-existing partitions by the corresponding thread.

6. The method of claim 1, wherein each of the one or more pre-existing partitions has a guaranteed throughput independent of any remaining partitions.

7. The method of claim 1, wherein allocating the one or more pre-existing partitions comprises allocating unassigned partitions already existing in the queue.

8. The method of claim 1, wherein the request for the subscription comprises a type of traffic the third-party customer is interested in and a destination for the information.

9. The method of claim 8, further comprising:
   recognizing an inbound message that matches the type of traffic the third-party customer is interested in; and
   forwarding the inbound message to the third-party customer using the destination.

10. The method of claim 1, wherein the information stored in the central cloud-based system is pushed into the central cloud-based system by one or more third parties and wherein the information comprises both raw data and transformed data.

11. The method of claim 1, wherein the central cloud-based system comprises XCloud.

12. The method of claim 1, wherein the request for the subscription comprises a representational state transfer (REST) request.

13. A bandwidth manager for allocating bandwidth in a central cloud-based system, comprising:
   a memory; and
   a processor executing computer instructions stored in the memory, causing the bandwidth manager to:
   receive a request for a subscription for information stored in the central cloud-based system from a third-party customer;
   allocate one or more pre-existing partitions in a queue to the third-party customer responsive to the request for the subscription, the one or more pre-existing partitions each having dedicated corresponding threads, a number of the one or more pre-existing partitions being determined by an estimated amount of traffic associated with the requested subscription for the third-party customer; and provide information meeting terms of the subscription to the third-party customer using the allocated one or more pre-existing partitions in the queue and the corresponding threads.

14. The bandwidth manager of claim 13, wherein the bandwidth manager is further configured to:
   determine, responsive to the request for the subscription, if the one or more pre-existing partitions are already reserved for the third-party customer; and
   allocate the one or more pre-existing partitions only if it is determined that the one or more partitions have not been already reserved.

15. The bandwidth manager of claim 13, wherein the bandwidth manager is further configured to:
   receive a request for additional bandwidth from the third-party customer; and
   allocate additional unused pre-existing partitions in the queue responsive to the request for additional bandwidth.

16. The bandwidth manager of claim 13, wherein the bandwidth manager is further configured to:
   monitor the central cloud-based system for an available number of pre-existing partitions;
   determine if the available number of pre-existing partitions is below a predefined threshold; and
   create new queues having partitions if it is determined that the available number of pre-existing partitions is below the predefined threshold.

17. The bandwidth manager of claim 13, wherein each of the one or more pre-existing partitions in the queue has a single corresponding source coupled to the one or more pre-existing partitions by the corresponding thread.

18. The bandwidth manager of claim 13, wherein the request for the subscription comprises a type of traffic the third-party customer is interested in and a destination for the information.

19. The bandwidth manager of claim 18, wherein the bandwidth manager is further configured to:
   recognize an inbound message that matches the type of traffic the third-party customer is interested in; and
   forward the inbound message to the third-party customer using the destination.

20. A computer program product for allocating bandwidth in a central cloud-based system, the computer program product comprising:
   a non-transitory computer readable storage medium having computer readable program code embodied in said medium, the computer readable program code comprising:
   computer readable program code to receive a request for a subscription for information stored in the central cloud-based system from a third-party customer;
   computer readable program code to allocate one or more pre-existing partitions in a queue to the third-party customer responsive to the request for the subscription, the one or more pre-existing partitions each having dedicated corresponding threads, a number of the one or more pre-existing partitions being determined by an estimated amount of traffic associated with the requested subscription for the third-party customer; and
   computer readable program code to provide information meeting terms of the subscription to the third-party customer using the allocated one or more pre-existing partitions in the queue and the corresponding threads.

* * * * *